Nov. 10, 1953  H. J. GREEN  2,658,212
UNIVERSAL TRAILER SLEEPING UNIT
Filed Dec. 8, 1949  4 Sheets-Sheet 2
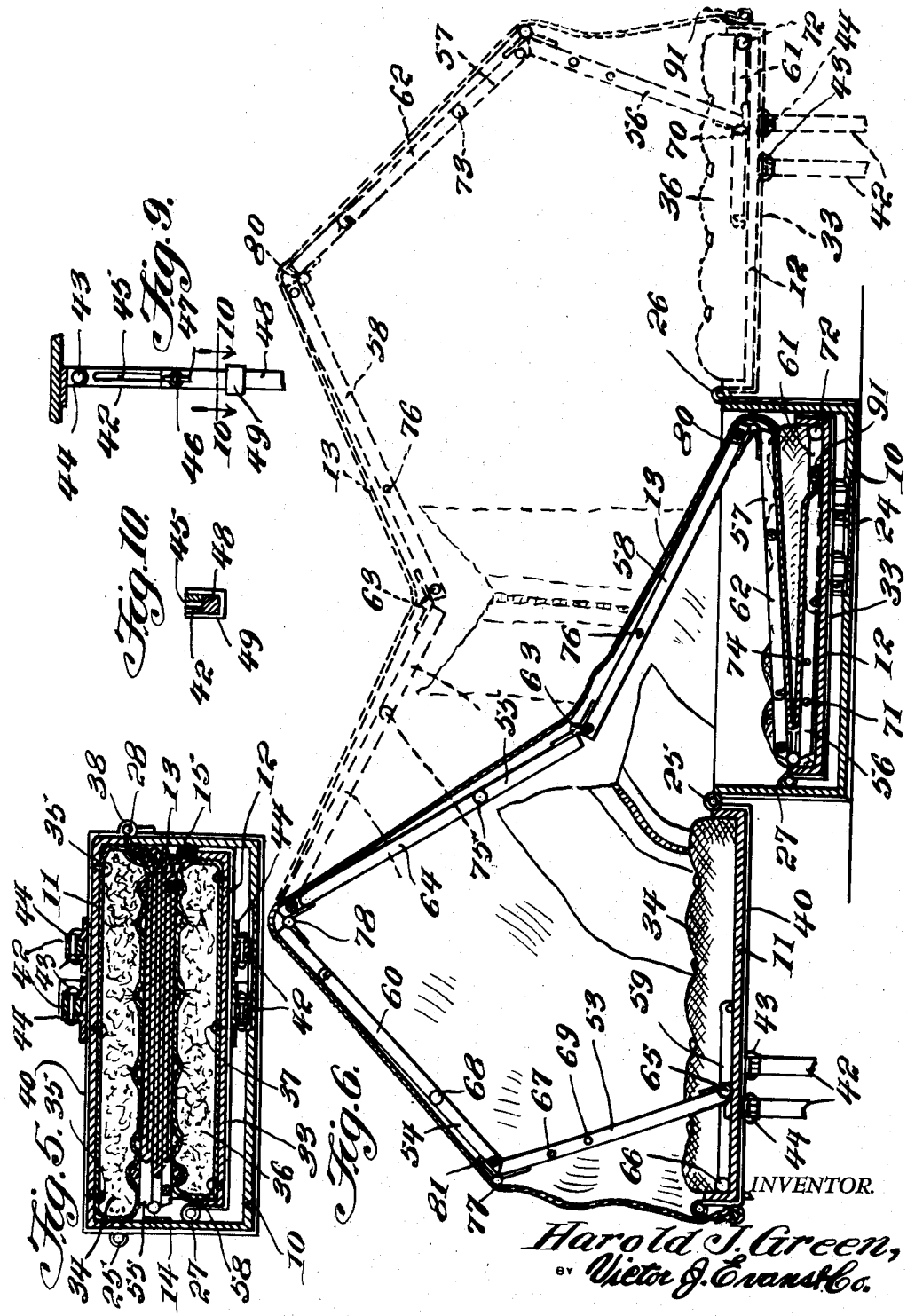
INVENTOR.
Harold J. Green,
BY Victor J. Evans & Co.
ATTORNEYS

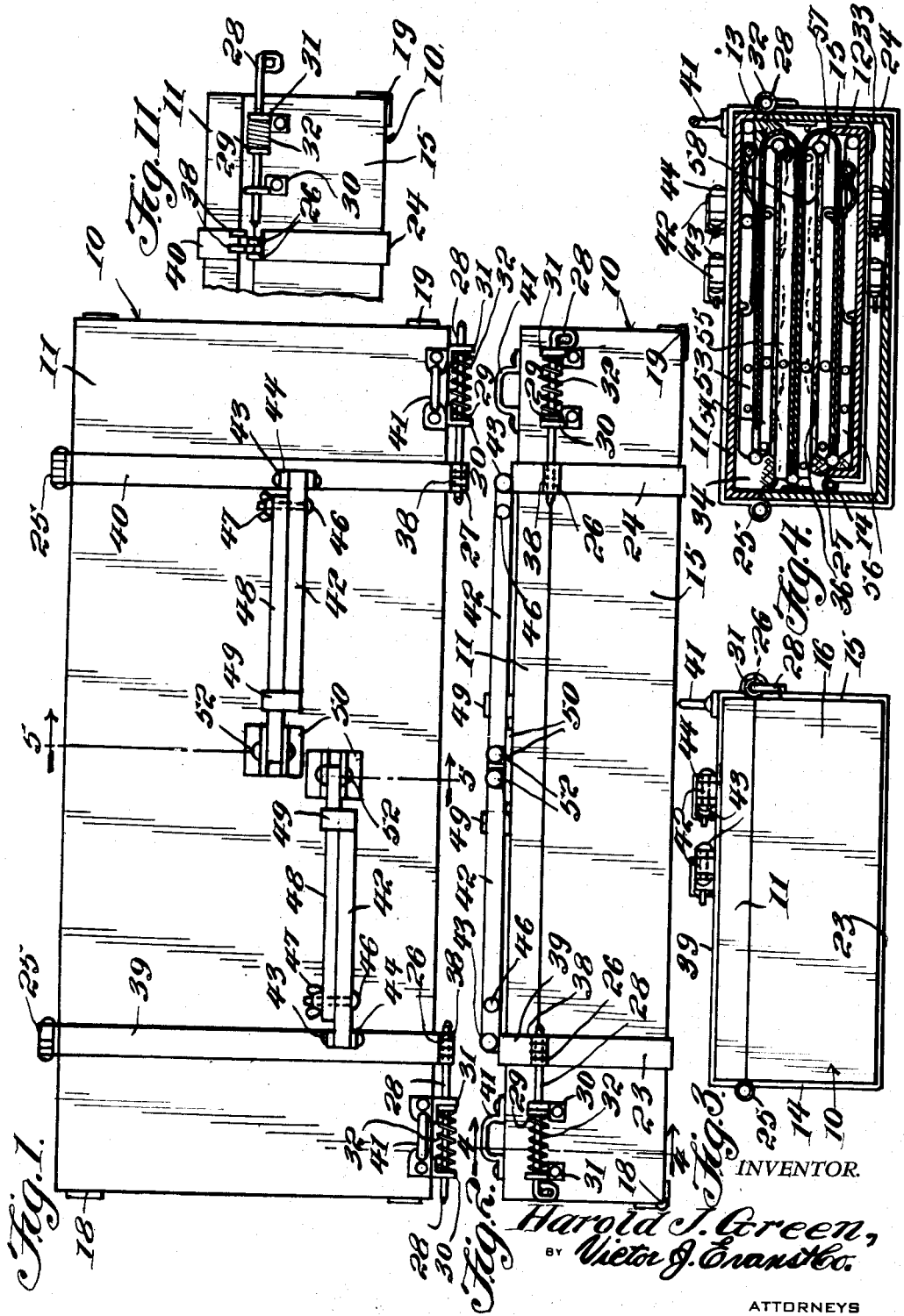

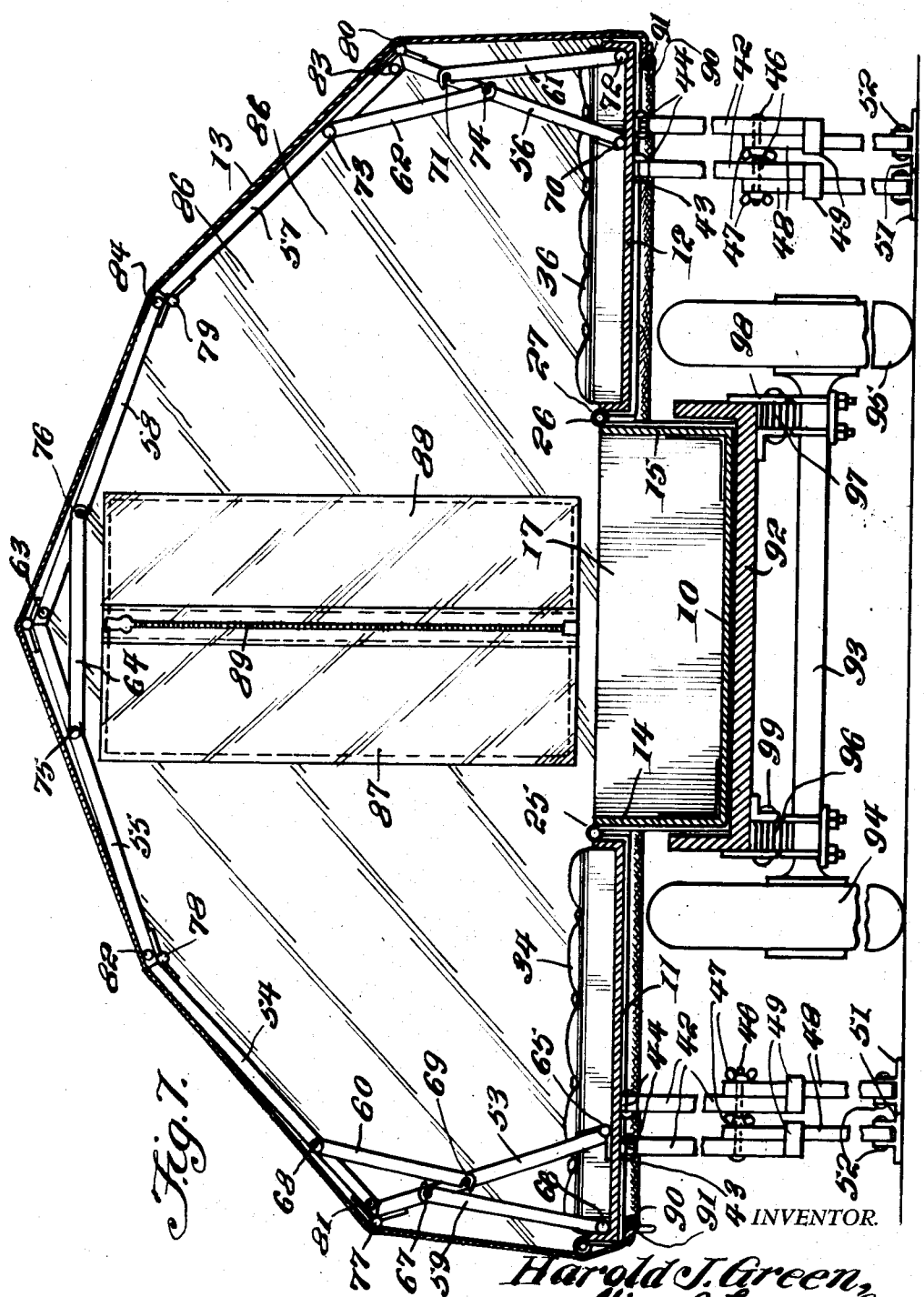

Nov. 10, 1953 H. J. GREEN 2,658,212
UNIVERSAL TRAILER SLEEPING UNIT
Filed Dec. 8, 1949 4 Sheets-Sheet 4
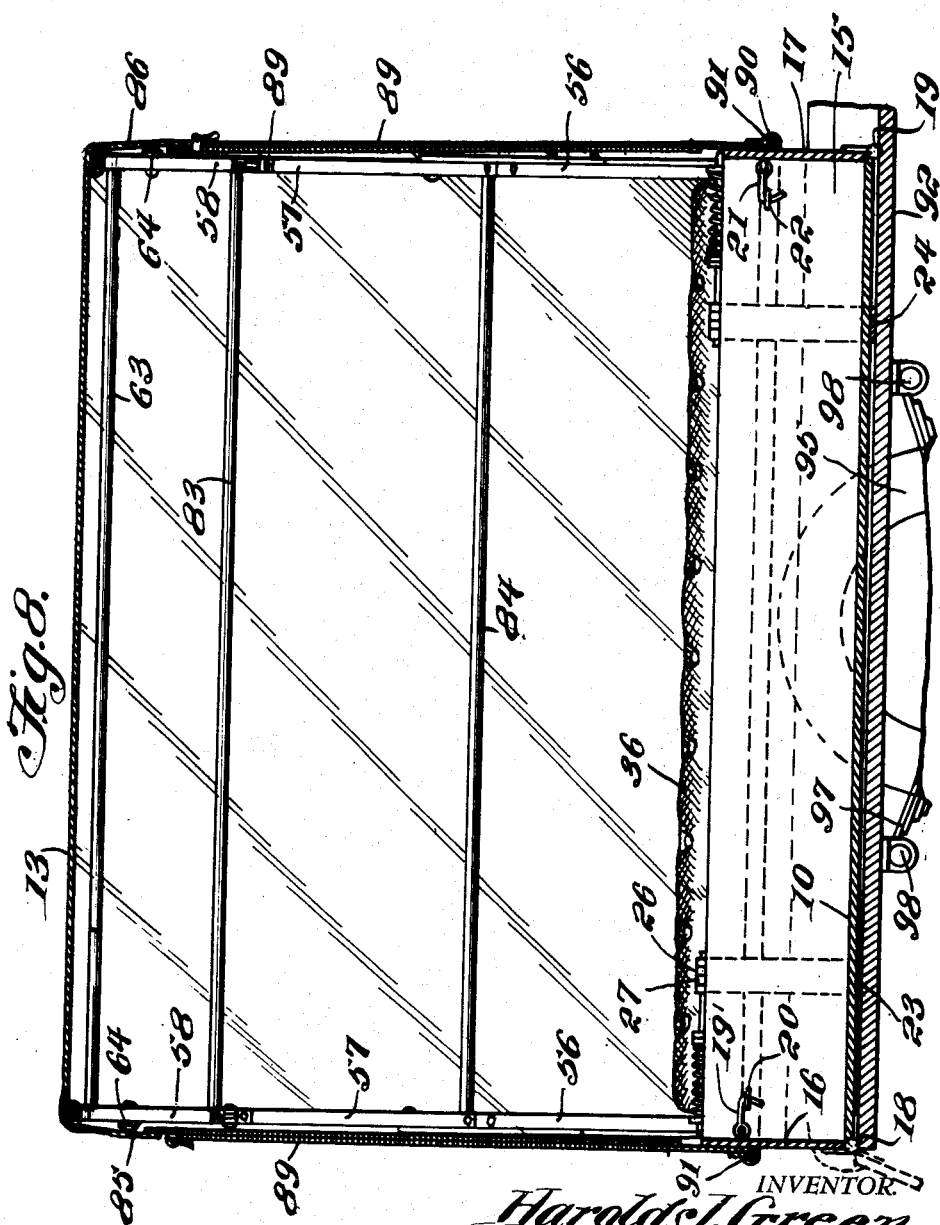

Patented Nov. 10, 1953

2,658,212

UNITED STATES PATENT OFFICE 2,658,212

UNIVERSAL TRAILER SLEEPING UNIT

Harold J. Green, West Branch, Mich.

Application December 8, 1949, Serial No. 131,849

2 Claims. (Cl. 5—113)

This invention relates to folding tents or sleeping units or motor vehicle trailers, and in particular a collapsible sleeping unit that may be folded into a comparatively small box or casing and that may be opened to provide an enclosed area with a plurality of beds therein wherein the unit may be carried as a two or four wheel trailer or may be stored in a motor vehicle and opened for use as desired.

The purpose of this invention is to provide a collapsible sleeping unit that may be taken on motor vehicle trips to provide a sleeping unit when desired and that eliminates the necessity of hauling a full size trailer.

Various types of sleeping units have been combined with trailers and built into the structure thereof but where the size of a trailer is sufficient to provide sleeping quarters a trailer license is required and towing thereof through traffic is objectionable. For many trips a full size trailer is not required and for this reason this invention contemplates a comparatively small box like unit that may be towed on wheels or that may be attached to a pleasure car, station wagon, or truck which is adapted to be opened up to provide comparatively large sleeping quarters when desired.

The object of this invention is, therefore, to provide a collapsible sleeping unit in which substantially all of the elements fold into a comparatively small box like casing.

Another object of the invention is to provide a sleeping unit for motor vehicles that may be purchased as a separate and independent unit and that may be attached to or used in combination with a pleasure car or other vehicle.

A further object of the invention is to provide a collapsible sleeping unit for motor vehicles that folds into a comparatively small box like casing, which is of a simple and economical construction.

With these and other objects and advantages in view the invention embodies an elongated box like casing having a cover with an inner spring mattress therein hinged to one side, a tray similar to the cover removably hinged to the opposite side and adapted to be positioned in the lower part of the casing, and a plurality of folding sections folded between the cover and tray, which when set up for use provide a tent like enclosure over the cover and tray.

Other features and advantages of the invention will appear from the following description taken in connection with the drawings wherein:

Figure 1 is a plan view showing the unit in the closed position.

Figure 2 is a side elevational view also showing the unit in the closed position.

Figure 3 is an end elevational view with the unit in the closed position.

Figure 4 is a cross section through the unit taken on line 4—4 of Figure 2 showing the elements folded within the casing.

Figure 5 is a similar cross section through the unit taken on line 5—5 of Figure 1.

Figure 6 is a similar section showing the parts partly open.

Figure 7 is also a similar section showing the parts in the full open position and illustrating the unit positioned on a trailer.

Figure 8 is a longitudinal section through a point substantially in the center of the unit.

Figure 9 is a detail illustrating one of the adjustable legs for supporting the cover and tray in the open position.

Figure 10 is a cross section taken on line 10—10 of Figure 9.

Figure 11 is a detail illustrating one of the separable hinges for attaching the tray to the side of the casing.

Referring now to the drawings wherein like reference characters denote corresponding parts the collapsible trailer sleeping unit of this invention includes a box like casing 10, a cover 11, a tray 12, a canvas tent like cover 13, and suitable collapsible folding elements adapted to be folded into the casing as shown in Figures 4 and 5 and also adapted to support the cover 13 as shown in Figure 7.

The casing 10 is formed with side walls 14 and 15 and end walls 16 and 17 and, as shown in Figure 8 the end walls are attached to the base 10 by hinges 18 and 19, respectively. The end wall 16 is secured in the upright position by hooks 19' that snap into eyes 20 and the wall 17 is held by hooks 21 that snap into eyes 22, the eyes being positioned on the side wall of the casing.

The casing is provided with surrounding metal bands 23 and 24 and hinges 25 are provided at the ends of the bands on one side of the casing for the cover 11. Hinges 26 are also provided at the ends of the bands on the opposite side of the casing and these hinges are formed as illustrated in Figure 11 wherein hinge elements 27 are removably mounted therein by pins 28 and the pins, which are provided with collars 29 are slidably mounted in clips 30 and 31 on the side 15 and the pins are resiliently held by a spring 32 whereby, when it is desired to collapse or fold the unit the pins 28 are withdrawn and the tray is separated from the casing and moved into the position shown in Figure 6 with the tray on the inside and in the lower part of the casing. The hinge elements 27 are provided on the ends of bands 33 that extend around the tray, as shown.

The cover 11, is permanently hinged to the upper edge of the side 14 of the casing 10 and when the unit is collapsed the cover is folded into the closed position as shown in Figures 4 and 5 with a mattress 34 that is secured in position therein by tacks 35 inverted, as illustrated in Figure 5. A similar mattress 36 is provided in the tray 12 and this may also be secured in position by tacks 37.

Hinged elements 38 are also provided on the ends of the bands 39 and 40 on the cover 11 and these hinged elements correspond to the elements 27 on the tray 12 whereby the hinge elements 38 also coact with the hinge elements 26 to provide latches for holding the unit closed with the pins 28 extended through the elements 26 and 38. The cover 11 may also be provided with handles 41 to facilitate opening and setting up the unit.

The outer surfaces of the cover 11 and tray 12 are also provided with adjustable supports and as these supports are similar the same reference numerals are used for the supports of each unit.

The supports are formed by upper sections 42 that are pivotally connected to units by pins 43 in clips 44 and these sections are provided with elongated slots 45 in which bolts 46 with thumb nuts 47 thereon are positioned and the bolts are mounted in lower sections 48 which slide through straps 49 on the lower ends of the sections 42. The lower ends of the sections 48 are provided with base plates formed with angles 51 and these are secured to the sections by pins 52. These supports are folded to the position shown in Figures 1, 2, and 5 when the unit is collapsed.

The cover 13 is supported above the beds of the unit by a plurality of struts and hooks forming diagonal braces with struts 53, 54, and 55 on one side and 56, 57, and 58 on the other, and the strut 53 is supported in the open position by hooks 59 and 60 with the strut 56 held by similar hooks 61 and 62 and with the struts 55 and 58 which support a roller 63 forming the ridge pole of the unit, supported by hooks 64.

The struts and hooks are provided in both ends of the unit and, as illustrated in Figure 7 the struts 53 are hinged to the cover 11 by hinges 65 and the hooks 59 are pivotally connected to the cover by pins 66. The hooks 59 hook over pins 67 on the struts 53 and the hooks 60 which are pivotally connected to the struts 54 by pins 68 hook over pins 69 on the struts 53. Likewise the struts 56 are hinged to the tray 12 by hinges 70 and the hooks 61 which hold over pins 71 on the struts are pivotally connected to the tray by pins 72. The hooks 62 are pivotally connected to the struts 57 by pins 73 and these hooks hook over pins 74 on the struts 56. The hooks 64 are pivotally connected to the struts 55 by pins 75 and the opposite ends hook over pins 76 on the struts 58.

The struts 53 and 54 are connected by hinges 77, the struts 54 and 55 by hinges 78, the struts 55 and 58 by the hinges 63, the struts 57 and 58 by hinges 79, and the struts 56 and 57 by hinges 80. The struts on one side are supported laterally by rods or rollers 81 and 82 on one side and 83 and 84 on the other.

It will be noted that with the struts formed in this manner the tray 12 is first removed from the side wall 15 of the casing and placed in the lower part of the casing as shown in Figure 6, the struts 56 are folded upon the tray, the struts 57 upon the struts 56, the struts 58 upon the struts 57, the struts 55 upon the struts 58, the struts 54 upon the struts 55, and the struts 53 are folded into the cover at the ends of the mattress as shown in Figure 4.

The covering 13 may be provided with ends 85 and 86 and the ends may be provided with flaps 87 and 88 providing doors therein and the flaps forming the doors may be connected by separable fasteners 89 or other closure means. The lower edges of the ends and side walls of the covering may be provided with hems 90 with a cable, or the like, as indicated by the numeral 91 therein.

With the parts arranged in this manner the collapsible sleeping unit may be folded into a compartively small casing and, as illustrated in Figure 7 the casing may be positioned on a trailer bed 92 and the trailer bed may be mounted on an axle 93 having wheels 94 and 95 at the ends thereof through springs 96 and 97 and the springs may be attached to the bed by shackles 98 and 99, as shown in Figure 8.

It will also be understood that the casing may be provided as a separate and independent unit and may be attached to a motor vehicle of the pleasure type, or to a station wagon or truck as may be desired.

It will also be understood that modifications may be made in the design and arrangement of the parts without departing from the spirit of the invention.

What is claimed is:

1. A trailer sleeping unit comprising an elongated rectangular shaped casing, a cover having a mattress therein hinged to one side of the casing and mounted for movement into and out of a closed position on the upper end of the casing, said cover being mounted for swinging movement about a horizontal axis, a tray having a mattress therein removably hinged to one side of the casing and being slightly smaller than the casing to facilitate being positioned in the casing, a canvas covering, a plurality of hinged struts hinged to the inner surfaces of the cover and tray positioned to fold into the casing between the cover and tray and also positioned to be opened to upwardly extended positions for supporting the covering above the cover and tray with the cover and tray extended, hooks providing braces supporting the struts in upwardly extended positions, rods connecting the struts providing supporting means for the struts and covering, and means supporting the cover and tray in outwardly extended positions.

2. In a trailer sleeping unit, the combination which comprises a rectangular shaped casing having upwardly extended sides with hinged ends, means retaining the ends in upwardly extended positions, a box like cover having a mattress therein hinged to one side of the casing and adapted to fold to a closed position upon the casing with the mattress on the inside, said cover being mounted for swinging movement about a horizontal axis a tray also having a mattress therein removably hinged to the opposite side of the casing and adapted to be removed and positioned in the casing, adjustable supports extended downwardly from the cover and tray, a plurality of hinged struts hinged to the cover and tray and extended upwardly therefrom in the open position, hooks pivotally mounted on the cover, tray and struts and positioned to hook over pins on the parts thereof for supporting the struts in upwardly extended positions, said struts and hooks adapted to fold into the casing between the cover and tray, and a suitable covering extended over the struts, cover and tray when the tray, struts and cover are in opened position and said covering also adapted to fold to a closed position within the casing.

HAROLD J. GREEN.

References Cited in the file of this patent

UNITED STATES PATENTS

| Number | Name | Date |
|---|---|---|
| 1,185,181 | Collins | May 30, 1916 |
| 1,216,986 | Habig | Feb. 20, 1917 |
| 1,229,534 | Shattuck | June 12, 1917 |
| 1,241,342 | Chapman | Sept. 25, 1917 |
| 1,336,627 | Hannam | Apr. 13, 1920 |
| 1,435,251 | Moore | Nov. 14, 1922 |
| 2,415,342 | Dunn | Feb. 4, 1947 |
| 2,503,482 | Hamilton | Apr. 11, 1950 |